Figure 1:
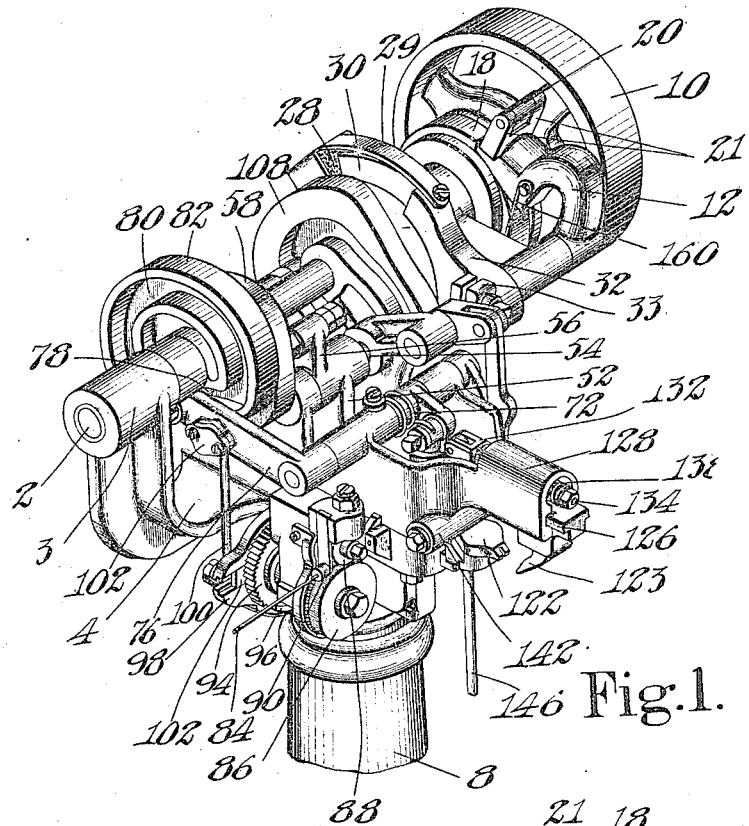

E. ERICKSON & J. W. COSGROVE.
MACHINE FOR FORMING AND INSERTING STAPLES.
APPLICATION FILED OCT. 10, 1912.

1,059,984.

Patented Apr. 29, 1913.
2 SHEETS—SHEET 1.

WITNESSES.

INVENTORS
Edward Erickson
John W. Cosgrove
By their Attorney
Nelson W. Howard

E. ERICKSON & J. W. COSGROVE.
MACHINE FOR FORMING AND INSERTING STAPLES.
APPLICATION FILED OCT. 10, 1912.

1,059,984.

Patented Apr. 29, 1913.

2 SHEETS—SHEET 2.

WITNESSES.
N. Dorsey Spencer
Elizabeth C. Coyle

INVENTORS.
Edward Erickson
John W. Cosgrove
By their Attorney
Nelson M. Howard

UNITED STATES PATENT OFFICE.

EDWARD ERICKSON, OF BEVERLY, AND JOHN W. COSGROVE, OF MEDFORD, MASSACHUSETTS, ASSIGNORS TO UNITED SHOE MACHINERY COMPANY, OF PATERSON, NEW JERSEY, A CORPORATION OF NEW JERSEY.

MACHINE FOR FORMING AND INSERTING STAPLES.

1,059,984.        Specification of Letters Patent.        Patented Apr. 29, 1913.

Application filed October 10, 1912.   Serial No. 724,988.

*To all whom it may concern:*

Be it known that we, EDWARD ERICKSON and JOHN W. COSGROVE, citizens of the United States, residing at Beverly, in the county of Essex and State of Massachusetts, and Medford, in the county of Middlesex and State of Massachusetts, respectively, have invented certain Improvements in Machines for Forming and Inserting Staples, of which the following description, in connection with the accompanying drawings, is a specification, like reference characters on the drawings indicating like parts in the several figures.

This invention relates to machines for inserting fastenings, and particularly to machines for forming and inserting staples, and is herein shown as embodied in a staple forming and inserting machine which is especially adapted to form and insert a staple of fine wire through the upper and the channel lip or rib or shoulder of the sole of a lasted shoe.

The illustrated machine is of the type disclosed in United States Letters Patent to Wilfred J. Drey, No. 1,011,592, granted December 12, 1911, for improvements in machines for use in the manufacture of boots and shoes, and the general object of the invention is to improve the machine disclosed in said Letters Patent to the end that the sequence of the operations of the various mechanisms of which the machine is made up may be so fixed and automatic and so related to the operation of the manually controlled elements of the machine that the manipulation of the manually controlled elements shall require a minimum amount of time and attention on the part of the operator, whereby both the capacity of the operator and the capacity of the machine may be increased and danger of injury to the work by reason of failure of the machine to follow the speed of the operator may be avoided. In the machine disclosed in said Letters Patent the parts through which the staple is to be inserted are clamped together by means operated through a treadle, and after these parts are clamped together the machine is actuated and a staple is then formed and inserted. It has been found in practice that it is substantially essential, in order to obtain the best results, that the clamping of the work be manually effected. It has been found, however, that in the construction disclosed in the Letters Patent there is a possibility of the operator, if he is in a hurry, permitting the work to become unclamped either before the staple forming and inserting mechanism is actuated, by reason of the fact that the actuation of said mechanism is effected in said machine by a knee lever, or before the staple is inserted, since the staple forming and inserting mechanism operates to form the staple to be inserted after said mechanism is actuated. If the operator manipulates the manually controlled parts in such manner that proper driving of the staple is insured, he is required to keep his foot upon the treadle of the machine of the said Letters Patent for a considerable time after the manual pressing together of the parts to be united has been effected.

One object of this invention, therefore, is so to determine the sequence of the operations of the various mechanisms of which the machine is made up that the work cannot become unclamped before the staple inserting mechanism is actuated, in any event, and furthermore so to relate the sequence of the operations of the manually controlled elements of the machine to the sequence of the operations of the automatically controlled elements of the machine that the operator does not require to retain control of the manually controlled elements of the machine beyond the time when the automatically controlled elements of the machine are actuated. To this end the means for pressing together and clamping the parts of the work to be united and the means for actuating the staple inserting and staple forming means are connected to a common manually controlled part in such manner that the means for clamping the work is moved into operative position before movement is imparted to the means for actuating the staple inserting and staple forming means sufficient to effect the actuation of said mechanism, and, moreover, the staple forming and staple inserting means are so organized that a staple is formed during the last part of each cycle of operations of the machine and is held in position for the operation of said inserting means, whereby the staple is inserted as soon as the inserting means is actuated. It will thus be seen that not only is the most effective sequence of operations insured, but the machine is so organized that it is substantially impossible for even the fastest operator to manipulate the manually controlled elements in such manner that the proper operation of the machine can be interfered with.

It will be noted that the importance of the above enumerated features of the invention is especially marked in a machine in which the staple is formed of fine wire. In such a machine it is absolutely essential to successful operation that the staple be formed in the machine and be retained in the forming means since the staple is so small and so light that it cannot be successfully handled in bulk and cannot be separated from a mass and directed so that it will be properly inserted, nor can it even be properly controlled without complicated mechanism if it be permitted to leave the forming means before the inserting operation.

With the above-described organization of the machine, the proper presentation of the work to the machine to receive a staple of fine wire is assured, the control of the staple is assured, and any manipulation of the machine by the operator which would interfere with the proper insertion of the staple is prevented. Moreover the insertion of the staple takes place so quickly after the completion of the manually effected operations that the capacity of the machine is sufficient to meet the demands of the fastest operator.

Other features and objects of the invention will appear from the following description and claims when considered in connection with the accompanying drawings, in which,—

Figure 2:
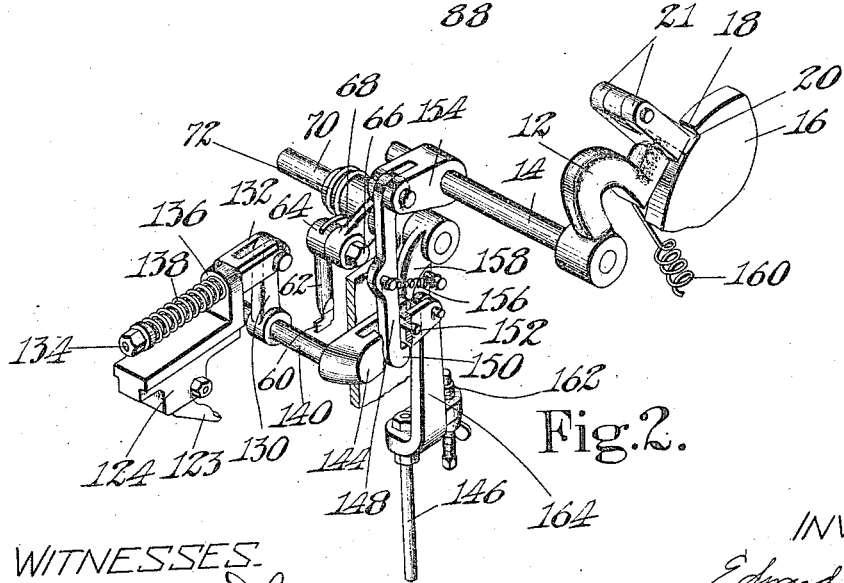
Figure 3:
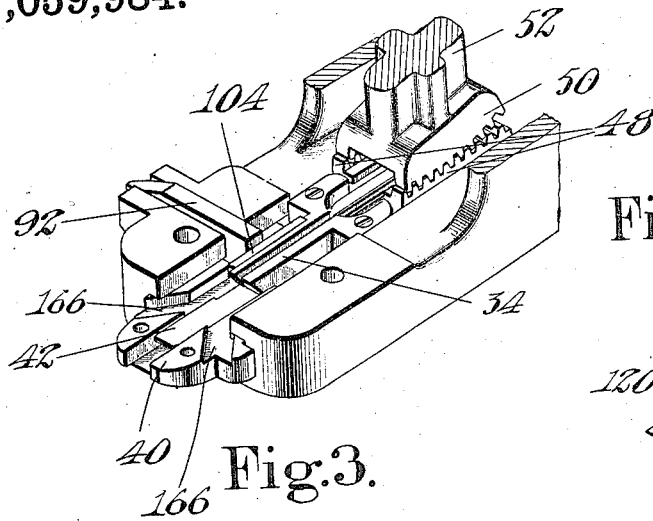
Figures 9, 10:
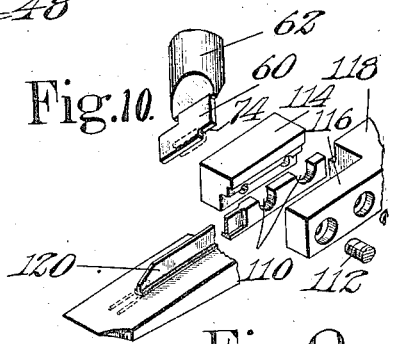

Figure 1 is a perspective view of the principal operative parts of a machine embodying the invention in the preferred form; Fig. 2 is a detail perspective showing the actuating mechanism and the connections between the actuating mechanism and the work clamping mechanism; Fig. 3 is a perspective detail of the staple forming and inserting means; Figs. 4, 5, 6, 7 and 8 are detail plans of the staple forming an inserting means illustrating the timing of the different parts of said means; Fig. 9 is an exploded view illustrating particularly the construction of the staple driver; and Fig. 10 is a perspective detail of the inside former.

Although the design of the machine has been modified, the principal operative parts of the machine are substantially the same and bear substantially the same relation to each other as the principal operative parts of the machine of the Letters Patent above identified.

The cams from which the various mechanisms are operated are connected to a main driving shaft 2 mounted in bearings 3 in the head 4 of the machine, these bearings having locations somewhat different from the locations of the corresponding bearings of the machine of the Letters Patent in order to give more substantial support to the cam shaft and also to provide for more convenient arrangement of the connections between the cams and the various mechanisms of which the machine is made up. The head 4 is mounted upon a standard 8 which is carried upon a base, not herein shown, in which base is located a treadle, also not shown, for effecting the manual control of the operation of the machine. A driving pulley 10, loosely mounted upon the shaft 2, is arranged to be clutched to the shaft at the will of the operator by any suitable clutch mechanism, the clutch herein illustrated being of the Horton clutch type.

A clutch controlling arm 12 upon a rock-shaft 14 normally holds the clutch in its inoperative condition, the roller cage 16 of the clutch being provided with a stop portion 18 which normally engages a spring-cushioned dog 20 pivoted between ears 21 upon the end of the arm 12. When the arm 12 is turned in a counter-clockwise direction about the axis of the rock-shaft 14, see Fig. 2, the dog 20 is lifted out of engagement with the stop 18 and the roller cage 16 is rotated by a spring, not shown, in the usual manner to bring the usual rollers of the Horton clutch into clutching position between a clutch member fixed upon the shaft 2 and a cylindrical clutch surface upon the inside of the pulley 10. A spring 160 tends to maintain the arm 12 normally in its clutch releasing position. The brake arm 32 is also carried by the rock-shaft 14, being mounted upon an eccentric clamped upon the shaft 14 by a clamp 33, and is movable into and out of braking relation to the brake disk 30 by said eccentric as the rock-shaft is oscillated during the clutch releasing and clutch actuating movements of the lever 12. The brake may be adjusted by adjusting the eccentric about the shaft 14. The brake disk 30 is kept free from oil, which might prevent the proper operation of the brake, by a wiper 28 of felt or other material carried by a spring 29 attached to the brake 32.

The staple forming and inserting mechanism comprises, as in the machine of the Letters Patent, an outside former 34 arranged to slide in a guideway 36 in the machine head, this guideway being formed in the illustrated machine in a plate 38 which also has formed upon it the lower part 40 of the nose of the machine. As in the machine of the Letters Patent, the outside former carries with it a tongue 42 which projects in front of the former and engages the work just before the staple is inserted to press together the parts through which the staple is to be inserted, close to the line of insertion.

The outside former 34, which is made in two parts to save expense of replacement of the part most subjected to wear, has a forked rearward extension 44 guided in a guideway 46 in the machine head and each of the branches of said extension is provided with rack teeth 48 which mesh with teeth 50 of a segment rack carried by a lever 52 fulcrumed upon a rock-shaft 54 and having upon its other arm 56 a cam roll which enters a cam groove in the cam disk 58 upon the main shaft 2. The outside former coöperates, to form a staple, with an inside former 60 carried upon a vertical plunger 62 having at its upper end a slotted head 64 through the slot in which passes a bolt 66 carried by an arm 68 upon a rock-shaft 70. A spring 72 surrounding the hub of the arm and bearing against the upper side of the head 64 tends to keep the upper end of the slot in the head 64 in engagement with the bolt 66, but permits lost motion after the inside former has come into its proper operative position, thereby avoiding the necessity for accurate adjustment of the parts.

To prevent the wire from moving out of position as it is fed or severed the inside former has formed in its lower face a notch 74 which comes over the wire as the inside former comes into operative relation to the outside former. The means for rocking the shaft 70 to move the inside former into and out of operative relation to the outside former comprises an arm 76 upon one end of said rock-shaft, which arm carries a cam roll 78 which enters a cam groove 80 in a cam disk 82 upon the driving shaft 2. The wire 84 from which the staple is to be formed is fed into a position to be operated upon by the staple formers by feeding means comprising a toothed feed wheel 86 against which the wire is pressed by a spring-pressed presser roll 88 geared to the feed wheel 86, the wire being guided between said feed wheel and presser roll by a guide 90 and being guided to the staple forming mechanism from the feeding mechanism by a guide 92. The feed wheel 86 is rotated, as in the machine of the Letters Patent, by a connection to the arm 76 which operates the inside former. The illustrated connection comprises a ratchet wheel 94 upon the shaft which carries the feed wheel 86, said ratchet wheel being adapted to be turned by pawls 96 upon a lever arm 98 fulcrumed upon the shaft which carries the feed wheel. The lever arm 98 is oscillated about said shaft by a connection to the arm 76 comprising a link 100 having a ball at its upper end received in a socket 102 on the arm 98 and pivoted at its lower end upon a block 103 adjustable in a slot in the arm 98, to vary the amount of throw of the feeding mechanism at each feeding operation. The wire, having been fed into position between the staple formers, is severed as in the machine of the Letters Patent by a cutter 104 connected to the outside former.

Figure 8:
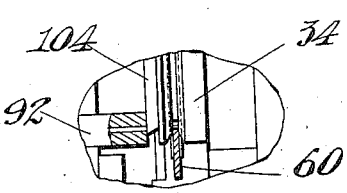

The staple having been formed is driven into the work by a driver 106 operated, as in the machine of the Letters Patent, from a cam 108 upon the shaft 2. To facilitate manufacturing and also to facilitate replacement of the driver when broken, the driver is preferably formed, as shown in Fig. 8, with two semicircular notches 110 adapted to be slipped over the shanks of two screws 112 by which a clamp member 114 is held against the coöperating clamp portion 116 of the driver slide 118. By simply loosening up the screws 112 the driver may be removed from the bottom of the slide 118, when said slide has been drawn back, and a new driver slipped into position over the screws and clamped between the clamp members. The driver is prevented from working down out of its position between the clamp members when the parts are in proper adjustment by the fact that it rests upon a supporting surface located between the branches of the forked extension 44 of the outside former.

The driver, as in the machine of the Letters Patent, is guided in the staple forming and guiding groove of the outside former and has a vertical rib 120 which is guided in a vertical groove in the outside former. The outside former at the end of its forward movement engages or stops in close proximity to the rear end of the upper part 122 of the nose of the machine, the forward end of this nose being shaped as in the machine of the Letters Patent to enter between the lasting tacks of a lasted shoe to guide the staple into the proper location in said shoe.

A staple clenching tool 123, which also serves to clamp the work, is carried, in the illustrated machine, by a slide 124 which slides in a guideway 126 in a forked extension 128 of the machine frame, the staple clenching tool being moved into work clamping relation to the nose by connections with the treadle comprising an arm 130 which is received at its upper end between the branches of a forked extension 132 of a bolt 134 passing loosely through an opening in an upright portion 136 of the slide 124. Confined between a nut and washer upon one end of the bolt 134 and the upright portion 136 of the slide 124 is a spring 138 through which yielding pressure may be exerted upon the work. The arm 130 is attached to a rock-shaft 140 arranged to turn in a bearing 142 upon the machine head, this rock-shaft being provided at one end with a second arm 144 which is slotted and which is pivotally connected at its outer end with a link 146 connected to a treadle, not shown, in the base of the machine. Depression of the treadle acts first through the connections just described, to move the clenching tool 123 into work clamping relation to the nose of the machine and particularly into work clamping relation to the upper part 122 of the nose. Continued depression of the treadle operates to move the clutch controlling arm 12 out of clutch releasing position and to actuate the machine.

The connections for effecting the actuation of the machine comprise a link 148 depending within the slot in the arm 144 and having on its lower end a hook 150 adapted to engage a pin 152 which extends across the slot. The link 148 is pivotally connected at its upper end to an arm 154 attached to the rock-shaft 14 and is drawn toward the pin 152 by a spring 156 connected at one end to a stud upon the link and at its other end to a stud upon the machine frame.

It will be noted from the position of the parts in Fig. 2 that lost motion is provided in these connections to provide for the clamping of the work before the pin 152 engages the hook 150 upon the link to actuate the machine. After the work is clamped, continued depression of the treadle causes the pin 152 to engage the hook 150 upon the link 148, thereby drawing down the link and rocking the shaft 14 in a counter-clockwise direction whereby the arm 12 is moved out of its clutch releasing position. As the machine is started, a knock-off device 158, formed by an arm upon the shaft 70 through which the inside former is operated, strikes the rear face of the link 148 and moves the hook 150 out of engagement with the pin 152, thereby permitting a spring 160 to return the arm 12 to its clutch releasing position. An adjustable stop 162 carried by an angle piece 164 forming the upper part of the link 146 abuts against the underside of the head of the machine and determines the amount of lost motion between the pin 152 and the hook 150. To provide for the removal of wire chips and misformed staples, grooves 166 are provided in the plate 40, these grooves opening upon the two sides of the staple guiding nose.

Figures 4, 5, 6:
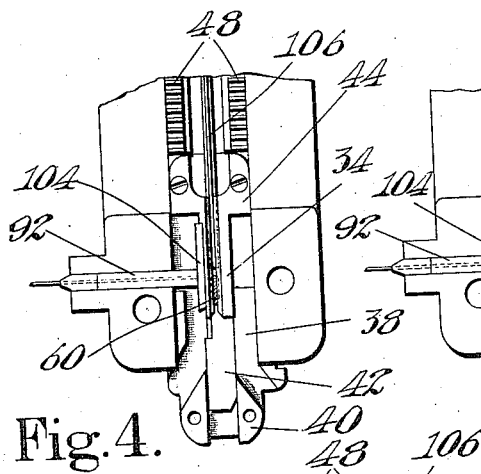
Figure 7:
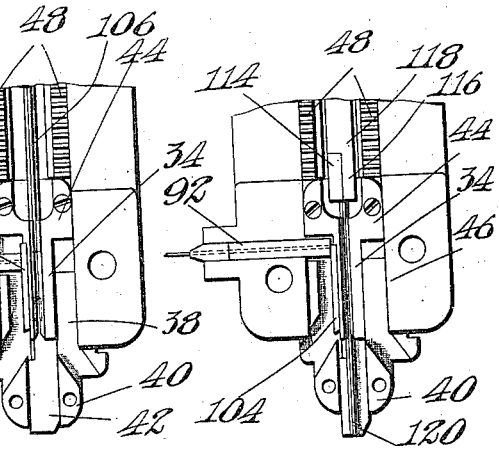

It remains now to describe the timing of the parts whereby the capacity of the machine has been increased and the proper insertion of a properly formed staple is assured in spite of any manipulation which the operator may make of the manually controlled means for actuating the machine. In Fig. 4 of the drawings is shown the position of the parts of the staple forming and driving mechanism when the machine is stopped. From this figure it will be noted that the inside former is in operative relation to the outside former, that the wire has been fed into position between the formers, and that the outside former has moved forward to sever the wire and form a staple and has then stopped with the staple still held in position by the inside and outside formers. The tongue 42 which serves to effect the further clamping action upon the work close to the line of insertion just before the staple is to be driven is back from the end of the nose to permit the work to be placed for the most effective action of this tongue. The work having been placed in position between the nose and the clenching tool 123, depression of the treadle first causes the clenching tool to clamp the work between itself and the nose. Further depression of the treadle operates the connections above described to clutch the driving pulley 10 to the shaft 2, thus starting the machine in operation. As soon as the shaft 2 begins to turn, the inside former is first lifted out of the way of the driver, the knock-off device 158 strikes the link 148 and releases the arm 12, thereby preventing the machine from repeating; the tongue 42 moves forward to engage the work and clamp it tightly just below the point of insertion and the driver 106 immediately follows and drives the staple, which has already been formed, into the work. The operation of the tongue 42 is shown in Fig. 5 and the operation of the driver is shown in Fig. 6. The driver and outside former then move back into the position shown in Fig. 7, the wire is fed forward, the inside former comes down and hooks over the wire and the outside former is then moved forward together with the cutter to sever the wire and form the staple as shown in Figs. 8 and 4, the parts again stopping in the position shown in Fig. 4.

From the foregoing description it will be noted that the operator has only to see that the treadle is depressed sufficiently to actuate the machine, when his attention can immediately be placed upon the next operation of the machine.

Having described our invention, what we claim as new and desire to secure by Letters Patent of the United States is:

1. A machine for attaching an upper to the channel lip or rib or shoulder of a sole, comprising, in combination, automatic staple inserting means, automatic staple forming means organized to form a staple after the operation of the inserting means and during the same cycle of operations of the machine and to stop with the staple held in position to be acted upon by said inserting means during the next cycle of operations of the machine, means for pressing together the parts to be united and manually controlled means connected to said pressing means to operate said pressing means and having provision for further movement, after said pressing means has been operated, to actuate said automatic inserting means to cause said inserting means to drive the staple which has previously been formed by and is held in said forming means.

2. In a machine for attaching an upper to the channel lip or rib or shoulder of a sole by means of a staple of fine wire, automatic staple inserting means, automatic staple forming means organized to form a staple of fine wire after the operation of the inserting means and during the same cycle of operations of the machine and to retain said staple in position to be acted upon by said inserting means during the next cycle of operations of the machine, means for pressing together the parts to be united, and manually controlled means connected to said pressing means to operate said pressing means and having provision for further movement after said pressing means has been operated to actuate said automatic means to cause the inserting means to drive a staple which has previously been formed by and is retained in said forming means and to cause said forming means to form another staple and retain it in position for the operation of said inserting means during the next cycle of operations of the machine.

3. In a machine for attaching an upper to the channel lip or rib or shoulder of a sole by means of a staple of fine wire, automatic means for pressing together the parts to be united along a line close to the line of insertion, automatic staple inserting means, automatic staple forming means organized to form a staple of fine wire and to retain said staple in position to be acted upon by said inserting means, other means for pressing together the parts to be united before the actuation of said automatic means, and manually controlled means connected to said last mentioned pressing means to operate said pressing means and having provision for further movement after said pressing means has been operated to actuate the automatic means to cause said automatic pressing means to exert its pressing action upon the work, to cause said inserting means to drive the staple which has been formed by and is held in said forming means and to cause said forming means then to form another staple to be driven by said inserting means during the succeeding cycle of operations.

4. In a machine for attaching an upper to the channel lip or rib or shoulder of a sole by means of a staple, staple inserting means, staple forming means comprising an inside former and an outside former, said staple forming means being organized to form a staple and to retain said staple between the inside and outside formers until said inserting means is actuated, a staple guiding nose, a staple clenching tool arranged to be moved into work pressing relation to said nose, manually controlled means for effecting the work pressing movement of said clenching tool having provision for further movement to actuate said inserting means and said forming means, and means connected with said inside former to interrupt the actuating connections as said inside former moves out of the path of said inserting means.

5. In a machine for attaching an upper to a channel lip or rib or shoulder of a sole by means of a staple, staple inserting means, staple forming mechanism comprising an inside former arranged to hold a staple in position to be operated upon by said inserting means until said inserting means is actuated and then to be moved out of the path of said inserting means, a staple clenching tool guided to slide toward and away from said inserting means to clamp and unclamp the work, a rock-shaft having one arm yieldingly connected to said clenching tool, manually operated means for rocking said shaft, said means comprising a second arm upon said shaft, actuating connections between said second arm and said inserting means comprising a pivoted link movable into and out of engagement with said arm, and means connected to said inside former for moving said link out of engagement with said arm as the inserting means begins to operate.

6. In a machine of the class described, fastening inserting means, work clamping means, manually controlled means for effecting the operation of said work clamping means having provision for further movement to actuate said inserting means, the actuating connections between said manually controlled means and said inserting means comprising a rock-shaft having thereon a clutch controlling arm and a brake operating eccentric, said eccentric being adjustable about said shaft to vary the braking action of said brake.

7. In a machine of the class described, a driver, and a driver clamp, said driver having formed in its upper face a plurality of notches, and a support upon which the lower face of the driver rests and over which it slides, said clamp being arranged to engage the lateral faces of said driver and being provided with clamping screws received in said notches.

In testimony whereof we have signed our names to this specification in the presence of two subscribing witnesses.

EDWARD ERICKSON.
JOHN W. COSGROVE.

Witnesses:
CHESTER E. ROGERS,
LAURA M. GOODRIDGE.